(12) United States Patent
Dünnwald et al.

(10) Patent No.: US 11,993,461 B2
(45) Date of Patent: May 28, 2024

(54) DEVICE HAVING A GUIDE UNIT FOR GUIDING A CONVEYOR BELT

(71) Applicant: ScrapeTec GmbH, Kamp-Lintfort (DE)

(72) Inventors: Wilfried Dünnwald, Kamp-Lintfort (DE); Michael Prenner, St. Margarethen bei Knittelfeld (AT); Thorsten Koth, Neukirchen-Vluyn (DE)

(73) Assignee: ScrapeTec GmbH, Kamp-Lintfort (DE)

( * ) Notice: Subject to any disclaimer, the term of this patent is extended or adjusted under 35 U.S.C. 154(b) by 0 days.

(21) Appl. No.: 18/285,931

(22) PCT Filed: Mar. 24, 2022

(86) PCT No.: PCT/EP2022/057781
§ 371 (c)(1),
(2) Date: Oct. 6, 2023

(87) PCT Pub. No.: WO2022/214325
PCT Pub. Date: Oct. 13, 2022

(65) Prior Publication Data
US 2024/0083688 A1    Mar. 14, 2024

(30) Foreign Application Priority Data
Apr. 8, 2021 (DE) .................... 10 2021 108 695.7

(51) Int. Cl.
*B65G 39/16* (2006.01)
*B65G 15/64* (2006.01)
*B65G 43/02* (2006.01)

(52) U.S. Cl.
CPC ............. *B65G 39/16* (2013.01); *B65G 15/64* (2013.01); *B65G 43/02* (2013.01)

(58) Field of Classification Search
CPC ......... B65G 39/16; B65G 15/64; B65G 43/02
See application file for complete search history.

(56) References Cited

U.S. PATENT DOCUMENTS 4,214,689 A    7/1980    Bartel et al.
5,515,139 A *  5/1996    Hou ..................... G03G 15/755
                                                        399/167

(Continued)

FOREIGN PATENT DOCUMENTS

CN    108438809 B    11/2019
GB    2246824 A      2/1992

(Continued)

*Primary Examiner* — Mark A Deuble
(74) *Attorney, Agent, or Firm* — The Webb Law Firm

(57) ABSTRACT

A device for guiding a conveyor belt, having a guide unit with an outer and an inner hollow-cylindrical body, the inner hollow-cylindrical body having a first central axis and being arranged in the outer hollow-cylindrical body, which has a second central axis, and both hollow-cylindrical bodies each have a central axis, with at least one bearing for rotatably mounting the outer hollow-cylindrical body on the inner hollow-cylindrical body and with an articulation body designed for mounting the inner hollow-cylindrical body on a central axle, wherein the articulation body is further designed to allow a horizontal and/or vertical change in angle of the first and/or second central axis relative to a central axis of the central axle. In order to increase the service life of the conveyor belt, the device is equipped according to the invention with a measuring and evaluating system including a sensor unit arranged inside and/or outside the guide unit, wherein the measuring and evaluating system is designed to detect the change in angle. The invention is based on the consideration that from a control behavior of the device, the causes of a fault of the belt run can be identified, deduced or narrowed down. Furthermore, a system for monitoring and guiding a conveyor belt using a device according to the invention is described.

15 Claims, 11 Drawing Sheets

(56) References Cited

U.S. PATENT DOCUMENTS

| | | | |
|---|---|---|---|
| 5,833,171 A * | 11/1998 | Harris | B65H 23/0251 |
| | | | 242/615.1 |
| 6,981,583 B1 * | 1/2006 | Donnenhoffer | B65G 39/16 |
| | | | 198/810.03 |
| 7,886,895 B2 * | 2/2011 | Felton | B65G 39/071 |
| | | | 198/806 |
| 2009/0134373 A1 | 5/2009 | Arzberger et al. | |
| 2009/0219373 A1 * | 9/2009 | Tabata | B41J 11/007 |
| | | | 347/104 |
| 2017/0137229 A1 * | 5/2017 | DeVries | B65G 39/071 |
| 2022/0033190 A1 | 2/2022 | Baggio et al. | |
| 2023/0091822 A1 * | 3/2023 | Van Tienen | B65G 43/08 |

FOREIGN PATENT DOCUMENTS

| | | |
|---|---|---|
| JP | H3151111 A | 6/1991 |
| KR | 1020150076018 A | 7/2015 |
| KR | 1020180034790 A | 4/2018 |
| WO | 03068638 A1 | 8/2003 |

\* cited by examiner

DEVICE HAVING A GUIDE UNIT FOR GUIDING A CONVEYOR BELT

CROSS-REFERENCE TO RELATED APPLICATIONS

This application is the United States national phase of International Application No. PCT/EP2022/057781 filed Mar. 24, 2022, and claims priority to German Patent Application No. 10 2021 108 695.7 filed Apr. 8, 2021, the disclosures of which are hereby incorporated by reference in their entireties.

BACKGROUND OF THE INVENTION

Field of the Invention

The invention relates to a device for guiding a conveyor belt, in particular a conveyor belt for transporting bulk material, having a guide unit with an outer and an inner hollow-cylindrical body, the inner hollow-cylindrical body having a first central axis and being arranged in the outer hollow-cylindrical body, which has a second central axis, and both hollow-cylindrical bodies each have a central axis, with at least one bearing for rotatably mounting the outer hollow-cylindrical body on the inner hollow-cylindrical body and with an articulation body designed for mounting the inner hollow-cylindrical body on a central axle, wherein the articulation body is further designed to allow a horizontal and/or vertical change in angle of the first and/or second central axis relative to a central axis of the central axle. The central axle may be rotationally rigid or rotatably supported in mountings.

The articulation body may, for example, be a rubber body or rubber bearing. Furthermore, the invention relates to a system for monitoring and guiding a conveyor belt with a device of the aforementioned type.

The inner hollow-cylindrical body and the outer hollow-cylindrical body may also be referred to as the inner tube and the outer tube, respectively.

Description of Related Art

Conveyor belts are used in belt conveyors for transporting bulk materials such as coal, ores, sand, cement or the like, which provide a continuous transport flow. They allow long conveying lengths, high conveying rates and high conveying speeds with comparatively low drive power.

Various causes can lead to skewing and/or off-center running of the conveyor belt during operation of a belt conveyor system. This increases the wear of the conveyor belt, which can result in higher maintenance costs and downtimes and decreases the efficiency and cost-effectiveness of the belt conveyor system. In particularly severe cases, the belt conveyor system may even fail as a result of unexpected mechanical failure of the conveyor belt. Examples of causes influencing the belt run are a faulty or defective belt splice, dirty idlers, idlers not at right angles to the direction of belt travel, defective idlers, defects in the belt tension member, axle misalignment in parts or of a complete belt system, and environmental influences, in particular wind, ice and snow.

To avoid or reduce faults of the conveyor belt run, devices of the type mentioned above are sometimes used in conveyor belt systems to guide the conveyor belt. In the assembled state, in which the central axle is mounted by means of two bearings attached to a supporting frame of the conveyor belt system, the guide unit, in particular the outer hollow-cylindrical body, is in contact with the conveyor belt in such a way that the belt run can be influenced by a control intervention of the device. Such a control intervention is understood to mean a rotation and/or an inclination of the guide unit, the rotation of the guide unit being characterized by a substantially horizontal change in angle of the first and/or second central axis relative to a central axis of the central axle, and the inclination of the guide unit being characterized by a substantially vertical change in angle of the first and/or second central axis relative to a central axis of the central axle.

A disadvantage of such prior art devices is that control interventions due to causes requiring timely maintenance or shutdown of the system are not detected in good time.

Based on this, the invention is based on the object of specifying a device for guiding a conveyor belt, with which the service life of a conveyor belt can be increased.

SUMMARY OF THE INVENTION

This object is solved by a device having the features as described herein. Preferred and advantageous embodiments of the device according to the invention are indicated in the subclaims.

To solve the problem, a device of the type mentioned at the beginning is proposed which, according to the invention, is equipped with a measuring and evaluation system having at least one sensor unit, the sensor unit being arranged inside and/or outside the guide unit and the measuring and evaluation system being designed to detect the change in angle.

The invention is based on the consideration that from a control behavior of the device the causes for a fault of the belt run can be identified or deduced or narrowed down.

In this context, the control behavior of the device is understood to be the totality or a plurality of the control interventions occurring over the operation of the conveyor belt system, whereby the control behavior can be represented as a control curve. This control behavior changes with the operating state of the conveyor belt system. For example, a basic control behavior can be distinguished from a control behavior in normal operation, whereby a basic control behavior is characterized by the totality or a plurality of the control interventions in the case of a zero measurement (a new belt conveyor system that is not loaded or a properly maintained belt conveyor system), while a control behavior in normal operation is characterized by the totality or a plurality of the control interventions in the case of a loaded conveyor belt. Control interventions deviating from this, which are mostly characteristic of the cause causing the control intervention, consequently characterize an operating condition deviating from normal operation. Since the control intervention causes a change in angle, a detected change in angle can be used to identify the cause or causes for the control intervention or at least to narrow it down to a limited number of possible causes.

Knowledge of the cause or causes for one or more control interventions enables an assessment of any countermeasures that may be necessary, for example to reduce the wear of the conveyor belt and thus increase the operating time (service life) of the conveyor belt or to avoid unforeseen failures of the entire conveyor belt system as a result of a mechanical failure of the conveyor belt or another part of the conveyor belt system.

For this purpose, at least one sensor unit or a measuring and evaluation system, which has at least one sensor unit, is arranged inside and/or outside the guide unit, preferably on the central axle, for example on the lateral surface of the central axle, or held on or in the articulation body, the sensor unit being designed for measuring a change in angle (direct detection) or a measured variable associated with the change in angle (indirect detection). A measured variable associated with the change in angle can also be referred to as a measured variable proportional to the change in angle. In this context, the sensor unit can be arranged in a housing of the measuring and evaluation system or remotely therefrom inside and/or outside the guide unit. Preferably, the sensor unit is arranged protected inside the guide unit, preferably inside the outer hollow-cylindrical body of the guide unit. An evaluation unit of the measuring and evaluation system can be arranged inside or outside the guide unit, for example on the central axle outside the hollow-cylindrical bodies. Preferably, the evaluation unit of the measurement and evaluation system together with the at least one sensor unit is also arranged inside the guide unit, for example on the central axle. Alternatively, however, the at least one sensor unit and/or the evaluation unit of the measuring and evaluation system can also be arranged outside the guide unit, namely both outside the inner hollow-cylindrical body and outside the outer hollow-cylindrical body of the guide unit. The evaluation unit or the measuring and evaluation system can each be connected to an installation control system, for example a control room, and/or to an alarm device positioned near the guide unit. Alternatively or additionally, wireless communication of the evaluation unit or the measurement and evaluation system with maintenance personnel is also within the scope of the present invention. The maintenance personnel can then, if necessary, initiate measures to eliminate a malfunction.

According to a further embodiment of the invention, the communication of the evaluation unit or the measurement and evaluation system with an installation control system, for example a control room, and/or with maintenance personnel can advantageously take place by means of WLAN and/or via an Internet remote monitoring.

If the sensor unit measures a measured variable related to the angle change, the measurement and evaluation system can detect the angle change based on this measured variable. Preferably, the sensor unit is arranged in such a way as to enable the detection of a change in angle in the vertical or horizontal direction.

An example of a measured variable related to the change in angle is the distance between individual components of the device, which are moved relative to each other during a control intervention. For example, during a control intervention of the device, due to the special design of the articulation body, the distance between the mantle surface of the central axle and a (first) cylinder mantle inner surface of the inner hollow-cylindrical body and/or a (second) cylinder mantle inner surface of the outer hollow-cylindrical body changes in horizontal and/or in vertical direction. From the distances measured by the sensor unit before and during the control intervention or during and after the control intervention, the change in angle is detected and determined by the measuring and evaluation system, wherein for the detection or determination, which in the case of indirect measurement corresponds to a calculation of the change in angle from the difference of the distances, the distance between a fixed first axial position of the sensor unit relative to the center axis of the central axle and a second axial position at a distance from this position, again relative to the center axis of the central axle, must be known. This second axial position can be defined, for example, by the articulation center of the articulation body, with the first axial position of the sensor unit being axially spaced from the second position on the center axis of the central axle.

In an advantageous embodiment of the invention, the measuring and evaluation system may comprise at least one second sensor unit, preferably a second, a third and a fourth sensor unit, which are arranged within the guide unit, in particular within the housing of the measuring and evaluation system, and which are or is designed for a direct or indirect detection of the change in angle. The use of at least two sensor units enables the detection of changes in angle in two different directions, for example in the horizontal and in the vertical direction, so that also causes for control interventions can be identified, which cause a change in angle in a direction different to the running direction of the conveyor belt, which coincides for example with the horizontal direction. It is also possible to detect changes in angle that have a horizontal and a vertical component. The at least one second sensor unit is arranged in such a way that between a measuring direction of the first sensor unit and a measuring direction of the second sensor unit there is an angle which corresponds to the angle between the directions in which a change in angle is to be detected, wherein the sensor elements can be arranged in a common plane which extends perpendicularly to the center axis of the central axle. An arrangement of the sensor elements spaced along the central axis of the central axle is also conceivable.

In this context, measurement direction means the direction in which the sensor unit enables measurement of the change in angle or measurement of a measured variable related to the change in angle. For example, the measuring direction of a sensor unit based on an optical distance measuring method is the direction in which an emission and detection of light required for measuring the distance is made possible.

For example, if the detection of the change in angle is to be performed in the vertical direction and in the horizontal direction, the angle between the measurement directions of the first and second sensor units is preferably about 90°. However, the angle between the measuring directions can be adapted to the measuring requirements.

Furthermore, the arrangement of further sensor units within the guide unit is advantageous in order to improve the accuracy of the detected change in angle through the increased number of sensor elements or to enable detection in any number of directions or to increase the reliability of the measuring and evaluation system through a redundant arrangement of the sensor elements. In this way, a failure or severe contamination of individual sensor elements can be compensated until scheduled maintenance of the system. For a further improvement in accuracy or fail-safety, the sensor units can each be based on different measuring principles from one another.

According to a further advantageous embodiment of the invention, the at least one sensor unit is based on a contactless measuring principle for measuring the change in angle or a measured variable related to the change in angle. In this context, the at least one sensor unit can be, for example, an acoustic, an inductive, a capacitive, a magnetic, an optical or a piezoelectric sensor unit. For example, an inductive sensor unit can be arranged on the circumferential surface of the central axle, provided that the first and/or the second hollow-cylindrical body consist at least in sections of an electrically conductive material. An advantageous embodiment of the invention is characterized in that the at least one sensor unit comprises optical laser sensors. Such sensors (laser sensors) are available at comparatively low cost.

The use of a sensor unit based on a contactless measuring principle has the advantage that the rotation of the guide system relative to the central axle of the device does not lead to wear of the sensor, so that a long service life of the sensor unit is achieved and no failure due to wear of the sensor unit is to be expected.

In addition, the measurement and evaluation system may comprise at least one memory and computing unit. The memory and computing unit is thereby designed for storing detected changes in angle and/or for comparing a detected change in angle with stored changes in angle. Preferably, the memory and computing unit comprises all components required for storing and processing data, for example a microprocessor and a data memory, the data memory being permanently or detachably connected to the memory and computing unit. Further preferably, the memory and computing unit is an integral part of the measurement and evaluation system, which then comprises the required components and is designed, for example, as a single-board computer or the like.

The memory and computing unit makes it possible to store, over the entire or at least a partial period of an operating period of the device according to the invention, the changes in angle which characterize control interventions made by the device during operation. In this way, the operating behavior of the conveyor belt can be evaluated on the basis of the data obtained and the causes of the control interventions, which lead to increased wear of the conveyor belt, for example, can be detected or narrowed down.

An adjustment of a change in angle detected by the measuring and evaluation system with one or more stored changes of angle performed by the memory and computing unit makes it possible to identify deviating changes in angle and thus deviating control interventions that indicate an operating state of the conveyor belt deviating from normal operation. In the present context, adjustment is understood to mean a comparison, in particular a difference formation, of two or more changes in angle, the comparison comprising the time, frequency, direction and amplitude of the change in angle. In this context, the changes in angle stored in the memory and computing unit can correspond to changes in angle that were recorded by the measuring and evaluation system during previous operation of the conveyor belt and/or correspond to changes in angle that were recorded before operation of the conveyor belt, in particular during a zero measurement and/or normal operation. It is also within the scope of the invention that the changes in angle stored in the memory and computing unit are based on empirical values available for the conveyor belt or, for example, were calculated on the basis of a computer model during the design of the system comprising the conveyor belt.

Detected deviations can be marked separately in terms of data and stored, for example, as an error log in the memory and computing unit separately from the stored or to be stored changes in angle. The detected deviations can also be provided with a data field that clearly identifies the deviation and contains attributes such as frequency, date, time, possible cause of the deviation and/or group of causes of the deviation or similar information. A deviation exists if the numerical value obtained by the comparison exceeds in amount a previously defined permissible value stored in the memory and computing unit.

In addition, an indication signal can be provided by the measurement and evaluation system when a deviation is detected by the computing and memory unit, wherein the indication signal can be identical or specific for each deviation. For example, it is possible that the indication signal of a deviation caused by the control intervention due to dirty idlers, in particular dirty lower run idlers, is different from the indication signal indicating a deviation caused by a control intervention due to a failure of a belt connection. The indication signal may thus be used as an indicator of the cause causal to the control intervention and/or to notify maintenance personnel.

In a further embodiment, a voltage source, preferably a rechargeable voltage source, may be arranged within the guide unit and/or, for example, within the measurement and evaluation system. The voltage source is designed to supply the at least one measuring and evaluation system and may be detachably or fixedly arranged inside or outside the guide unit. By using a voltage source arranged in the guide unit, the measurement and evaluation system can be supplied with a voltage required for operation without the need for a complex and possibly failure-prone connection of the measurement and evaluation system to an external voltage source. An external voltage source is understood to be a voltage source which is arranged outside the guide unit. By arranging the voltage source inside the guide unit, a shielding of the voltage source from environmental influences, in particular from rain or from bulk material transported by the conveyor belt, is advantageously achieved.

Alternatively or in addition to a power supply by means of a voltage source, preferably a rechargeable voltage source, arranged near or inside the guide unit and/or the measuring and evaluation system, it is also within the scope of the invention to supply the measuring and evaluation system and/or the at least one sensor unit with electrical energy via supply cables through an external power source. In this respect, it is also possible to speak of a cable-based power supply of the measuring and evaluation system and/or the at least one sensor unit. Likewise, it is within the scope of the invention to connect the measuring and evaluation system via data cables or signal lines to an external installation control or monitoring device, for example a control room.

Preferably, supply electronics can be arranged within the guide unit and can be designed for wired or contactless supply of the measurement and evaluation system and/or for wired or contactless supply of the voltage source. Preferably, the electrical energy required to supply the measurement and evaluation system is transmitted by means of near-field transmission technology, with the electrical coupling between the supply electronics (transmitter) and the measurement and evaluation system (receiver) preferably being designed as an inductive, resonant inductive, magnetic resonant or capacitive coupling.

In a further embodiment of the device, the measurement and evaluation system has an interface unit that is designed, for example, for a wireless signal connection. The interface unit enables wireless communication of the measurement and evaluation system with an external receiver. Data acquired by the measurement and evaluation system or stored in the memory unit can be transferred to a receiver via the wireless communication with the receiver. In addition, the interface can be used to store changes in angle in the memory and computing unit that are to be used for an adjustment. In this context, the wireless communication can take place via a suitable radio technology, which can be selected depending on the area of application of the system comprising the device. By means of the wireless signal technology connection, long cable connections to the device can be eliminated, for example if the device is used in a very decentralized manner in a belt conveyor in an extensive open pit mine. A wireless signal connection can be established to centrally located receivers, for example a host system or a client server, as well as to decentralized and/or mobile receivers, for example a handheld device or smartphone.

According to a further embodiment of the invention, signal amplifying elements, for example signal amplifying wall sections, are arranged within the guide unit. The signal amplifying elements may be formed, for example, by a coating or an additional element which is applied to the wall section or which is attached to the wall section, respectively. It is also within the scope of the invention that the body comprising the wall section is designed at least in sections as a signal amplification element.

By a signal amplification element is meant an element which improves the measurement signal of a sensor element used for detecting the change in angle. For example, a section of the inner surface of the inner hollow-cylindrical body is electrically conductive or is provided in sections with a coating having a high degree of reflection in order to improve the measurement signal of an inductive or optical sensor element. The section may have an elongated extension in the axial direction and/or in the circumferential direction. The signal amplification element or elements are preferably arranged such that they face the sensor element in measurement directions. In addition to signal improvement, the arrangement of at least one signal amplification element can also be used to increase the choice of available measurement methods. For example, if the inner hollow-cylindrical body is made of an electrically non-conductive material, the arrangement of a signal amplification element made of an electrically conductive material enables the use of an inductive sensor unit.

According to a further advantageous embodiment of the invention, sealing elements are arranged within the guide unit, for example in the region of a first end and in the region of a second end of the outer hollow-cylindrical body or of the inner hollow-cylindrical body. The sealing elements can be designed as spring bellows, rubber sleeves or as lamellar or brush seals, whereby the selection of the sealing elements can be made taking into account the rotational speed of the outer and/or the inner hollow-cylindrical body. The sealing elements can be mounted on the central axle or arranged on the first or second inner surface of the cylinder shell or on the inner hollow-cylindrical body. A combination of these possibilities is conceivable if the sealing elements have several components. For example, for comparatively high speeds, brush seals can be used as sealing elements, which are arranged on the first inner surface of the cylinder shell in such a way that bristles forming a brush seal are oriented radially inwards in the direction of the central axle. In the event of a change in angle, the bristles consisting of elastic material are partially compressed or deflected from their original position and the reduction in the distance between the first cylinder shell inner surface and the shell surface of the central axle resulting from the change in angle is compensated. Alternatively or in addition to the brush seals, spring bellows or rubber sleeves can be sealingly connected to the inner hollow-cylindrical body, preferably to its outer shell surface, and to the central axle. The spring bellows or rubber sleeves are preferably designed to seal rolling bearings arranged between the outer hollow-cylindrical body and the inner hollow-cylindrical body against the ingress of dirt. The sealing elements, preferably spring bellows, prevent or reduce the ingress of impurity material, for example dust-like impurity material, into the guide unit, so that components arranged inside the guide unit, for example the at least one sensor unit or the measuring and evaluation system and the articulation body and/or rolling bearing, are hardly contaminated. This advantageously increases the service life of the components and avoids or reduces disturbing influences on the detection of the change in angle, in particular if the sensor elements used are based on a contactless measuring principle.

According to a further advantageous embodiment of the invention, the at least one sensor unit or the measuring and evaluation system is mounted on the central axle or on the inner hollow-cylindrical body, preferably pushed onto the central axle or plugged onto the inner hollow-cylindrical body. For this purpose, the components of the sensor unit or of the measuring and evaluation system can be arranged in a housing which, for example, is essentially annular in shape and has a central recess whose dimensions are adapted to the diameter or profile dimensions of the central axle. The radial extension of the housing is significantly smaller than the inner diameter of the outer or inner hollow-cylindrical body, so that the housing can be inserted into the guide unit and, in the assembled state, permits rotation or inclination of the hollow-cylindrical bodies relative to the central axle, so that the guide function (steering function) of the guide unit is possible without restriction. Preferably, the housing is detachably mounted on the central axle. Thus, the measuring and evaluation system can be pulled out of the guide unit, for example for maintenance purposes or for replacing the voltage source, and subsequently pushed back into the original position within the guide unit. Such an arrangement also makes it possible to retrofit existing devices that do not yet have a measurement and evaluation system. Further preferably, for improved reproducibility of a bearing position, which comprises both an axial position of the system along the central axle and an angular position relative to the vertical and/or horizontal direction, the central axle can have an axial stop and/or a guide element, for example a groove or spring. Furthermore, for improved reproducibility of the angular position, a position sensor or stabilizer, for example a gyroscope, may be integrated within the measurement and evaluation system.

According to a further advantageous embodiment, the device according to the invention is designed as a self-learning system. The device according to the invention thus allows, if necessary, a conclusion to be drawn about a specific malfunction of a conveyor belt system after a sufficient measurement period and data situation. Thus, reasons for malfunctions of the relevant conveyor belt system can be identified in an advantageous manner.

An advantageous embodiment of the invention is characterized in that the measuring and evaluation system is arranged outside the inner hollow-cylindrical body. In this case, the at least one sensor unit and the evaluation unit of the measurement and evaluation system are preferably arranged at a distance from one another. In this case, for example, a sensor holder is placed on one end of the inner hollow-cylindrical body and is preferably non-positively or frictionally connected thereto. The sensor holder is preferably bushing-shaped. A sealing element, preferably in the form of a spring or rubber bellows, can be connected to the sensor holder. The sealing element is connected to the central axle and seals the interior of the hollow-cylindrical body against dust ingress. In this case, the at least one sensor unit of the measuring and evaluation system is installed on the sensor holder. For example, the sensor holder is provided with four sensor units (sensors), which are distributed over the circumference of the bushing-shaped sensor holder and are arranged at a distance from one another. The sensor units preferably measure contactlessly in the direction of the central axle. An evaluation unit of the measuring and evaluation system can, for example, be mounted outside the outer hollow-cylindrical body of the guide unit on a holder supporting the central axle. Furthermore, at least a part of a supply electronics may also be arranged on the sensor holder. For example, mutually associated elements of a generator system of the supply electronics can be arranged on the shell surface of the sensor holder or on the inner side of the outer hollow-cylindrical body.

A further embodiment of the invention is characterized in that the at least one sensor unit is arranged at the end of the outer hollow-cylindrical body, preferably substantially or largely outside the outer hollow-cylindrical body, wherein a sensor holder is attached onto the central axle and is preferably non-positively or frictionally connected thereto. The sensor holder is, for example, of bushing-shaped design and preferably has a plurality of, for example four, sensor units (sensors) which are distributed over the circumference of the sensor holder and are arranged at a distance from one another. The sensor units preferably measure contactless in the direction of a reflector body or bushing-shaped body, which surrounds the sensor holder with radial clearance and is connected to the end of the outer hollow-cylindrical body, preferably in a rotationally fixed manner. For this purpose, the reflector body or bushing-shaped body has a connecting section which is or will be inserted into the outer hollow-cylindrical body in a force-locking or friction-locking manner. The sensors (sensor units) are connected to an evaluation unit of the measuring and evaluation system via signal lines, for example in the form of one or more cables. The evaluation unit can, for example, be mounted outside the outer hollow-cylindrical body of the guide unit on a bracket supporting the central axle.

The above-mentioned object is also solved by a system for monitoring and guiding a conveyor belt with a device according to the invention according to one of the above-mentioned embodiments and a recording unit, wherein the recording unit is designed for a signal-technical connection with the measuring and evaluation system.

The recording unit can be connected to the measuring and evaluation system, for example, by means of a signal line or by radio technology. By means of the signal connection, it is possible to transmit the changes in angle detected by the measuring and evaluation system to the recording unit, whereby the transmitted changes in angle can also correspond to changes in angle which are detected during the time of the connection or which are stored in the memory and computing unit of the measuring and evaluation system. A combination of these possibilities is also within the scope of the invention. Preferably, any further data and/or signals stored and/or generated by the measuring and evaluation system can additionally be transmitted, in particular an error log resulting from the adjustment. The connection can also be used to transfer the changes in angle required for the adjustment to the memory and computing unit. Preferably, the recording unit has an interface, in particular a bus system, for the data connection to an external data memory on which the changes in angle to be transferred to the measuring and evaluation system are stored or on which the changes in angle detected and/or stored by the measuring and evaluation system can be stored. The external data memory can preferably be connected to any computing unit and the stored data evaluated. For example, the data can be used for the development of algorithms that predict the control behavior of a system.

Preferably, the recording unit comprises an optical signal device and/or is designed for connection to an optical signal device. The optical signaling device may comprise at least one illuminant, preferably an LED or an LED array. The optical signal device can emit, by means of the illuminant, a light signal that can be perceived by a person, either constantly or periodically, when the optical signal device receives an activation signal. The activation signal can preferably be provided by the measuring and evaluation system or by the recording unit, wherein the activation signal corresponds to the indication signal of the measuring and evaluation system or is an independently generated signal. Depending on the activation signal, the illuminant of the optical signaling device emits one or more light signals to inform an observer about the operating state of the device or the system. For example, light is emitted periodically provided that a deviation or a change in angle has been detected as a result of a control intervention, which indicates an operating state deviating from normal operation. An observer can thus be informed about an operating condition that requires intervention or maintenance. Preferably, the optical signal unit can comprise further illuminants, so that a normal operating state, an operating state deviating therefrom and a critical operating state, for example an operating state causative of a possible failure of the system, can be indicated by means of different illuminants, wherein the emitted light can originate from mutually different spectral ranges of visible light, for example from a green, a yellow and a red spectral range, whereby different light colors can be used as an indicator of the operating state. Preferably, the signaling device comprises at least one green, one yellow and one red illuminant, by which is meant illuminants that each emit light in the spectral range assigned to the color.

In a further embodiment of the system according to the invention, the recording unit comprises an acoustic signal device and/or is designed for connection to an acoustic signal device. The acoustic signal device preferably comprises a sound transducer as well as the necessary control and transducer elements for generating an acoustic signal and may be arranged in the housing or remotely from the housing of the recording unit. The acoustic signaling device emits a tone and/or tones constantly or periodically, depending on the activation signal, whereby, for example, maintenance personnel are alerted to an operating state that deviates from normal operation.

Preferably, the recording unit of the system may comprise an evaluation unit and/or a display unit. The memory and computing unit of the evaluation unit is thereby preferably, analogously to the memory and computing unit of the measuring and evaluation system, designed for the storage of detected changes in angle and/or for the comparison of a detected change in angle with stored changes in angle and preferably also comprises the components which are required for the storage and processing of data. The display unit, for example an LCD or OLED display, is arranged in a housing of the recording unit in such a way that it can be read by a user. It is designed for displaying the operating status of the conveyor belt, whereby a color coding, a plain text, a numerical code or the like characterizing the operating status can be displayed for this purpose.

The presence of a memory and computing unit in the recording unit makes it possible to keep the memory and computing unit redundant, so that in the event of a failure of the memory and computing unit of the measuring and evaluation system or of the recording unit, the detected changes in angle can continue to be stored and adjusted and/or an activation signal can be generated which indicates the failure of the measuring and evaluation system or an interrupted connection between the measuring and evaluation system and the recording unit via the optical and/or acoustic signal device. However, it is also within the scope of the invention to have only a single memory and computing unit in the recording unit.

In a further embodiment of the system according to the invention, the recording unit is designed as a hand-held device. In this embodiment, the components necessary for an adjustment of the recorded and/or stored changes in angle are integrated in the hand-held device. The hand-held device can preferably be connected to the measuring and evaluation system via a wireless signal connection, so that the necessary data can be transmitted via this connection. In addition, the hand-held device preferably comprises a display unit, e.g. a display, which is designed for displaying the operating status of the conveyor belt and/or the conveyor belt system. By evaluating and displaying the data on the hand-held unit, a technician performing maintenance receives information about the cause or causes that led to a deviation. Accordingly, the technician is enabled to carry out the necessary work in a targeted and thus time-saving manner, so that the downtime of the system can be kept to a minimum.

The data transmission can be wireless or wired in the device or system according to the invention.

A further advantageous embodiment of the system according to the invention is characterized in that the conveyor belt has a marker or is provided with a marker, the system comprising a sensor for determining a measurement period and/or circulation time of the marker. Through this, additional measurement data concerning the measurement period and/or circulation time can be acquired, which are or can be combined, for example, with measurement data provided by the above-mentioned measurement and evaluation system.

According to a further advantageous embodiment of the system according to the invention, this comprises one or more sensors for detecting the rotational speed of one of the belt drums or idlers, preferably of the outer hollow-cylindrical body of the guide unit, and/or for detecting the conveyor belt position on one of the belt drums or idlers, for example on the outer hollow-cylindrical body of the guide unit.

BRIEF DESCRIPTION OF THE DRAWINGS

In the following, the invention will be explained in more detail with reference to a drawing illustrating examples of embodiments. It shows schematically.

DESCRIPTION OF THE INVENTION

Figure 1:
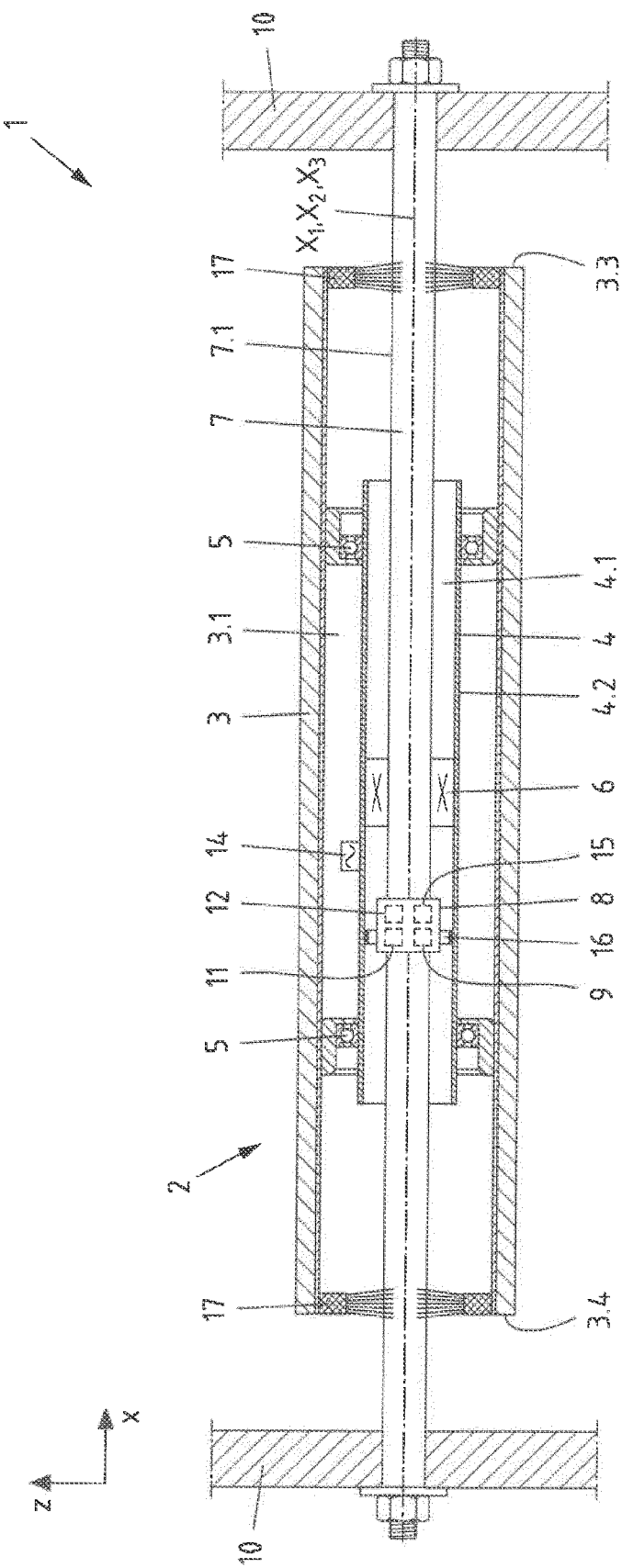
FIG. 1 a device according to the invention for guiding a conveyor belt, in a longitudinal section.

FIG. 1 shows a device 1 for guiding a conveyor belt (not shown). The device 1 generates steering movements to counteract skewing of the conveyor belt.

As is known per se, a conveyor belt of a belt conveyor lies on rollers (idlers) in the upper strand and lower strand. The rollers are inserted, for example, in roller blocks that are fixed in the supporting frame. Usually, there are different roller blocks for the upper strand and for the lower strand of the conveyor belt, which are attached to supporting beams of the supporting frame. The roller blocks of the upper strand (upper run) usually carry three rollers, which are arranged in a trough shape. The rollers of the lower strand (lower run) are often carried out as single rollers.

The device 1 for guiding or steering a conveyor belt according to FIG. 1 is preferably arranged in the lower run of the belt. The device 1 has a guide unit 2 with a central axel 7. The central axle 7 is mounted, for example, by means of lateral brackets 10 on the supporting frame of a belt conveyor. The central axle 7 is preferably fixedly mounted and does not transmit any rotational movements.

The guide unit 2 has an outer hollow-cylindrical body 3 and an inner hollow-cylindrical body 4. The inner hollow-cylindrical body 4 is arranged in the outer hollow-cylindrical body 3, the outer hollow-cylindrical body 3 being rotatably mounted on the inner hollow-cylindrical body 4 by means of bearings 5. In the embodiment shown, the bearings (rotary bearings) 5 are carried out as rolling bearings. The inner hollow-cylindrical body 4 has a first central axis ($X_1$), while the outer hollow-cylindrical body 3 has a second central axis ($X_2$) which coincides, i.e. corresponds, with the first central axis ($X_1$).

An articulation body 6 is provided for supporting the inner hollow-cylindrical body 4 on the central axle 7 defining a central axis $X_3$. The articulation body 6 is only schematically sketched in the drawing. The articulation body 6 is mounted on the central axle 7 and is preferably axially fixed. The articulation body 6 is designed, for example, as a rubber body or rubber bearing. The inner hollow-cylindrical body 4 is seated on the articulation body 6, the inner surface of the body 4 being supported on the articulation body 6. The hollow-cylindrical body 4 is preferably fixedly connected to a circumferential portion of the articulation body 6, for example by means of a screw connection. The axial extension of the articulation body 6 is significantly smaller than the axial extension of the body 4, with the articulation body 6 being arranged centrally within the body 4. Accordingly, the ends of the hollow-cylindrical body 4 project beyond the articulation body 6. The articulated mounting of the hollow-cylindrical body 4 on the central axle 7 enables horizontal rotation of the hollow-cylindrical bodies 3,4 with their central axes $X_1$, $X_2$ relative to the central axle 7 and its central axis $X_3$. Independently of this, the articulated support of the hollow-cylindrical body 4 on the central axle 7 also enables a (vertical) inclination of the hollow-cylindrical bodies 3, 4 with their central axes $X_1$, $X_2$ relative to the central axle 7 and its central axis $X_3$.

Figure 2:
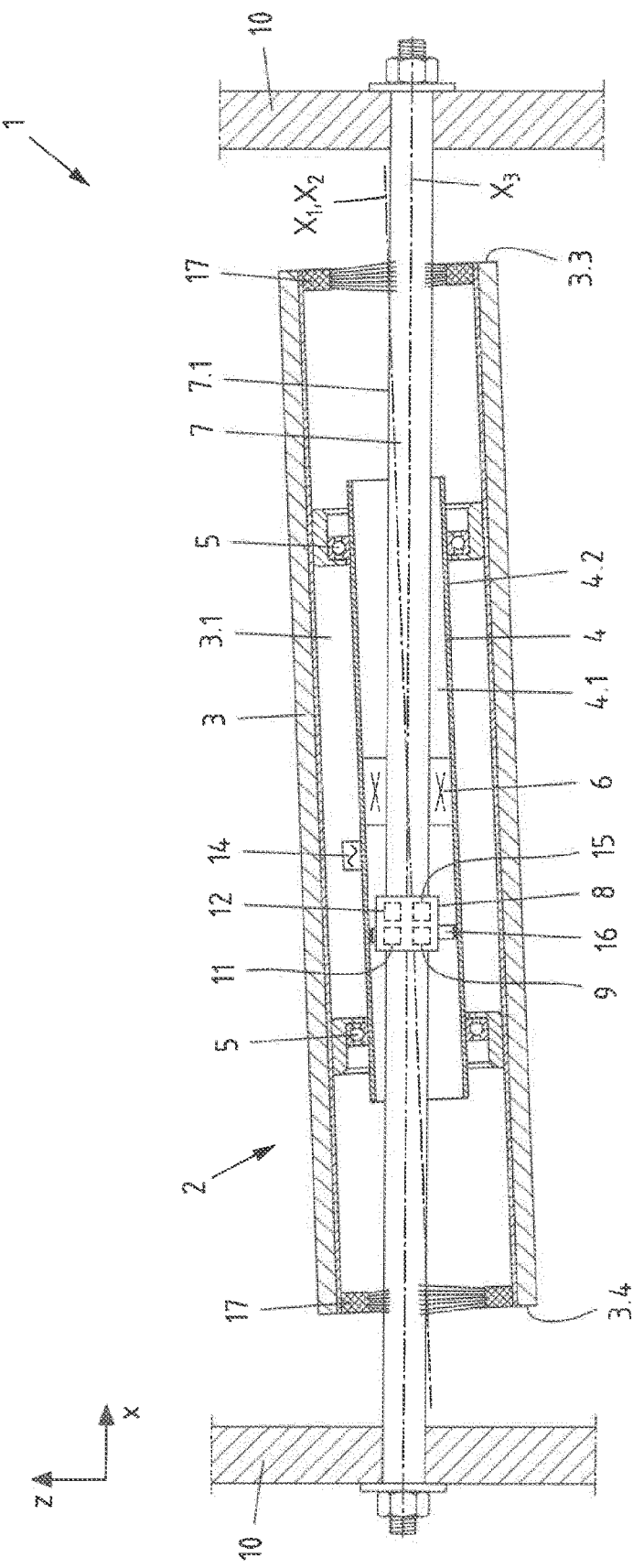
FIG. 2 the device of FIG. 1 in the same longitudinal section, wherein a guide unit of the device for a control intervention on the conveyor belt is rotated from a normal position into a steering position.

In other words, the articulated mounting of the hollow-cylindrical body 4 on the central axle 7 by means of the articulated body 6 enables a horizontal and/or a vertical change in angle between the central axes $X_1$, $X_2$ of the hollow-cylindrical bodies 3,4 and the central axis $X_3$ of the central axle 7 (see FIG. 1 and FIG. 2).

For the detection of this change in angle, which is accompanied by a control intervention of the device, at least one sensor unit 9 or a measuring and evaluation system 8, which comprises at least one sensor unit 9, is arranged within the guide unit 2. If the device is mounted within an installation, the central axle 7 is supported at two positions by means of lateral brackets 10. In FIGS. 1 and 2, the horizontal direction is indicated by x and the direction perpendicular thereto of the axial extension of the device 1 is indicated by z.

Deviating from the embodiment example shown in FIGS. 1 and 2, the evaluation system 8 can also be arranged or mounted outside the guide unit 2, for example on one of the brackets 10, wherein the at least one sensor unit 9 arranged inside the guide unit 2 is connected to the evaluation system 8 via a measuring or data cable.

As an example of a sensor unit based on a contactless measuring principle, the sensor unit 9 of the measuring and evaluation system 8 is designed as an inductive or magnetic distance sensor, for example as a Hall sensor. The arrangement shown enables indirect detection of the change in angle by measuring the distance between the inner cylinder surface 4.1 of the inner hollow-cylindrical body 4 and the outer surface or outer side 7.1 of the central axle 7. Since the distance between the axial position of the measuring and evaluation system 8 at the central axis $X_3$ and a second axial position spaced from this position, again at central axis $X_3$ of the central axle, is known, the change in angle can be detected and determined by the measuring and evaluation system 8 from the distances measured before and during the control intervention or during and after the control intervention. The said second axial position can be defined, for example, by the articulation center of the articulation body, the first axial position of the sensor unit 9 being axially spaced from the second position on the central axis $Z_3$ of the central axle 7.

For a storage of detected changes in angle and/or for a comparison of detected changes in angle with stored changes in angle, the measuring and evaluation system 8 has a memory and computing unit 11 in the form of a single-board computer which is arranged completely within the measuring and evaluation system 8. Alternatively, the memory and computing unit 11 can also be arranged outside the guide unit 2 and connected to the measuring and evaluation system 8 via a data cable.

The voltage supply of the measuring and evaluation system 8 is provided, for example, by a voltage source 12 arranged inside it in the form of a rechargeable battery. The capacity of the battery is designed in such a way that the measuring and evaluation system 8 can be supplied only by the voltage source 12 for a certain period of time, for example for a period of at least several weeks or months. For a supply extending beyond this period, a generator may be arranged within the guide unit 2. An electronic supply unit 14 arranged within the guide unit, which can also be connected to an optionally available current generator, enables a contactless supply of the measuring and evaluation system 8 as well as the voltage source 12.

Alternatively or in addition to a power supply by means of a battery 12 and/or a generator, it is also within the scope of the invention to supply the measuring and evaluation system 8 and/or the at least one sensor unit 9 with electrical energy via supply cables (not shown) by means of an external power source (not shown). Likewise, it is within the scope of the invention to connect the measuring and evaluation system 8 via data cables or signal lines to an external installation control or monitoring device, for example a control room.

Further, the measurement and evaluation system 8 has an interface unit 15 that enables a wireless signal-technical connection to an external receiver. For example, the wireless signal-technical connection is based on a local radio network of the IEEE 802.11 standard. Via this connection, the changes in angle detected and/or stored by the measurement and evaluation system 8 can be sent to an external receiver and changes in angle can be received from an external data source to be stored in the memory and computing unit 15.

To improve the measurement signal of the sensor element 8, a signal amplification element 16 may be arranged on a portion of the inner surface 4.1 of the hollow-cylindrical body 4. The signal amplification element 11, which is preferably made essentially of iron, is carried out in the form of a band, so that during a rotation of the outer hollow-cylindrical body 3 at least a partial region of the signal amplification element 11 always lies in the measuring direction of the sensor element 8 and the distance between the sensor element 8 and the inner surface 4.1 can be reliably measured by the inductive sensor element 8 for the indirect detection of the change in angle.

In the region of a first end 3.3 as well as in the region of a second end 3.4 of the outer hollow-cylindrical body 3, sealing elements 17 in the form of brush seals are arranged and connected to the inner surface 3.1 of the body 3 for preventing the ingress of contamination into the guide unit, wherein the bristles forming the brush of the brush seal, which are made of flexible material, are oriented radially inwards and, in a non-deflected state of the guide unit 2, delimit a minimum air gap between the sealing elements 17 and the central axle 7. In the event of a control intervention, as illustrated in FIG. 2 using the example of a rotation of the hollow-cylindrical bodies 3, 4 relative to the central axle 7, the flexible design of the sealing elements 17 ensures the sealing effect without appreciable impairment of a control intervention, whereby the bristles are partially elastically deformed (cf. FIG. 2). Alternatively or in addition to these brush seals, the sealing elements 17 can be carried out as spring bellows (rubber bellows) (cf. FIGS. 5 to 7).

Figure 3:
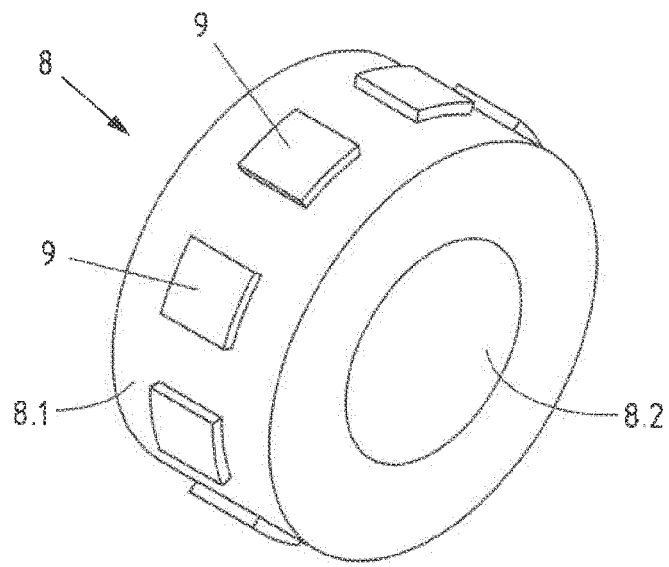
FIG. 3 a measurement and evaluation system in a perspective view.

All components of the measuring and evaluation system 8 shown in FIG. 3 are arranged, for example, in a substantially annular housing 8.1, the housing 8.1 having a central receptacle 8.2 which is somewhat larger than the diameter of the central axle 7, so that the measuring and evaluation system 8 can be pushed onto the central axle 7 and mounted thereon. The radial dimension of the housing 8.1 is thereby adapted to the inner diameter of the hollow-cylindrical body 4, so that the measuring and evaluation system 8 can be arranged within the body 4. In addition to the sensor unit 9, the measuring and evaluation system 8 can have a second sensor unit 9 which is arranged in such a way that the measuring direction of the second sensor unit 9 is angled by approximately 90° with respect to the measuring direction of the first sensor unit 9, so that the first sensor unit 9 can be used for detecting a horizontal rotation of the hollow-cylindrical bodies 3,4 relative to the central axle 7, while the second sensor unit 9 can be used for detecting an inclination of the hollow-cylindrical bodies 3, 4 relative to the central axle 7. In this case, a stabilizer supporting the orientation of the housing 8.1 can be integrated into the measuring and evaluation system 8, so that the measuring directions of the first sensor element 9 and the second sensor element 9 are oriented accordingly when the measuring and evaluation system 8 is pushed onto the central axle 7.

Figure 4:
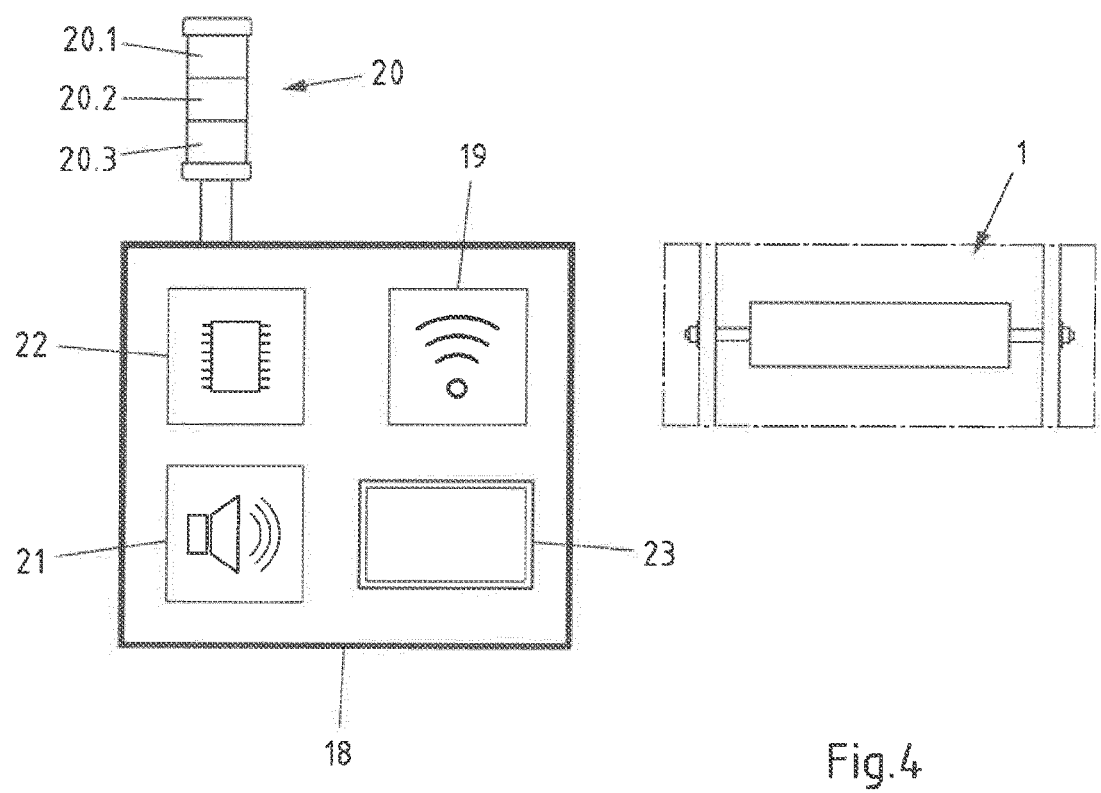
FIG. 4 a system for monitoring and guiding a conveyor belt with a device for guiding a conveyor belt and a recording unit in an overview.

FIG. 4 shows a system for monitoring and guiding a conveyor belt, which comprises the device 1 described above and a recording unit 18. The recording unit 18 has a communication or connection module 19 for a radio technology-based connection with the measuring and evaluation system 8. This signal technology-based connection makes it possible to send to the recording unit 18 the changes in angle detected by the measuring and evaluation system 8 during the period of the connection and/or the data stored in the memory and computing unit 11 of the measuring and evaluation system 8 and/or to transmit to the memory and computing unit 11 one or more changes in angle required for adjustment within the memory and computing unit 11.

The recording unit 18 is equipped with an optical signaling device 20 comprising a red illuminant 20.1, a yellow illuminant 20.2, and a green illuminant 20.3. An activation signal for activating the signal device 20 is provided by the memory and computing unit 11 of the measuring and evaluation system 8 in the embodiment example shown (cf. FIGS. 1 and 2). The activation signal is modulated in such a way that in a normal operating state of the belt conveyor, in which no deviating control behavior of the guide unit 2 occurs, the green illuminant 20.3 constantly emits light. In the event of deviating control behavior, the activation signal causes light to be emitted periodically by means of the yellow illuminant 20.2, whereby the frequency of the light signal can be used as an indicator of the cause of the deviating control behavior. For example, the yellow illuminant 20.2 emits light with a comparatively low frequency in the case of influences that have little effect on the control behavior, such as slightly dirty idlers or non-optimal belt connections. The emission of light by means of the red illuminant 20.1 indicates a control behavior which points to causes which, if not remedied, are known to result in a prompt failure of the conveyor belt.

In addition, the recording unit 18 may include an acoustic signaling device 21 that includes a sound transducer and control and transducer elements. The acoustic signaling device 21 emits one or different beeps depending on the activation signal.

An evaluation unit 22 integrated in the recording unit 18 has a memory and computing unit corresponding to the memory and computing unit 11 of the measuring and evaluation system 8, which provides the same functionality. In the event of a failure of the memory and computing unit 11 of the measuring and evaluation system 8, the memory and computing unit of the evaluation unit 22 generates an activation signal for the optical and/or acoustic signal device 20, 21, so that the failure can be indicated. Furthermore, the recording unit 18 shown comprises a display unit 23 in the form of an LCD display. On this display unit 23, a numerical code is displayed which denotes the operating state or the control behavior of the guide unit 2. If an operating state deviating from normal operation is present, a numerical code denoting the cause is displayed.

Figure 5:
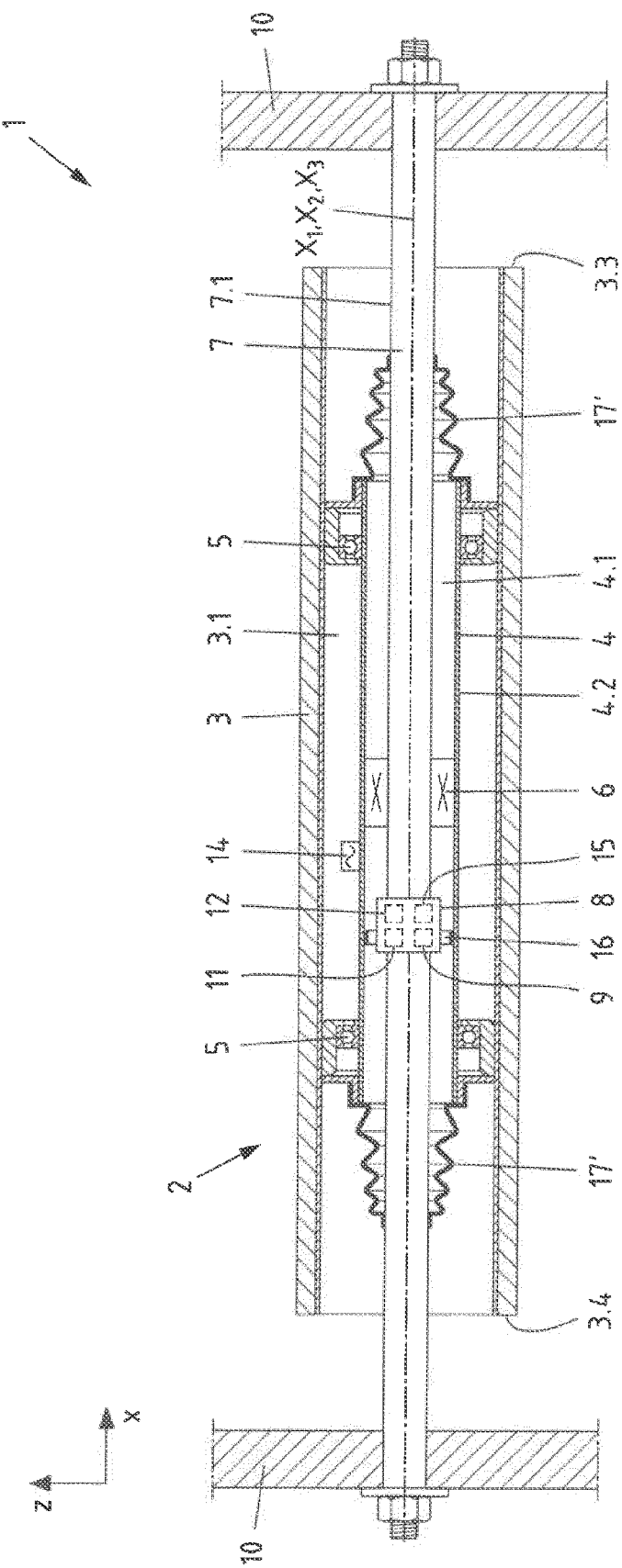
FIG. 5 a further embodiment of a device according to the invention for guiding a conveyor belt, in a longitudinal section.
Figure 6:
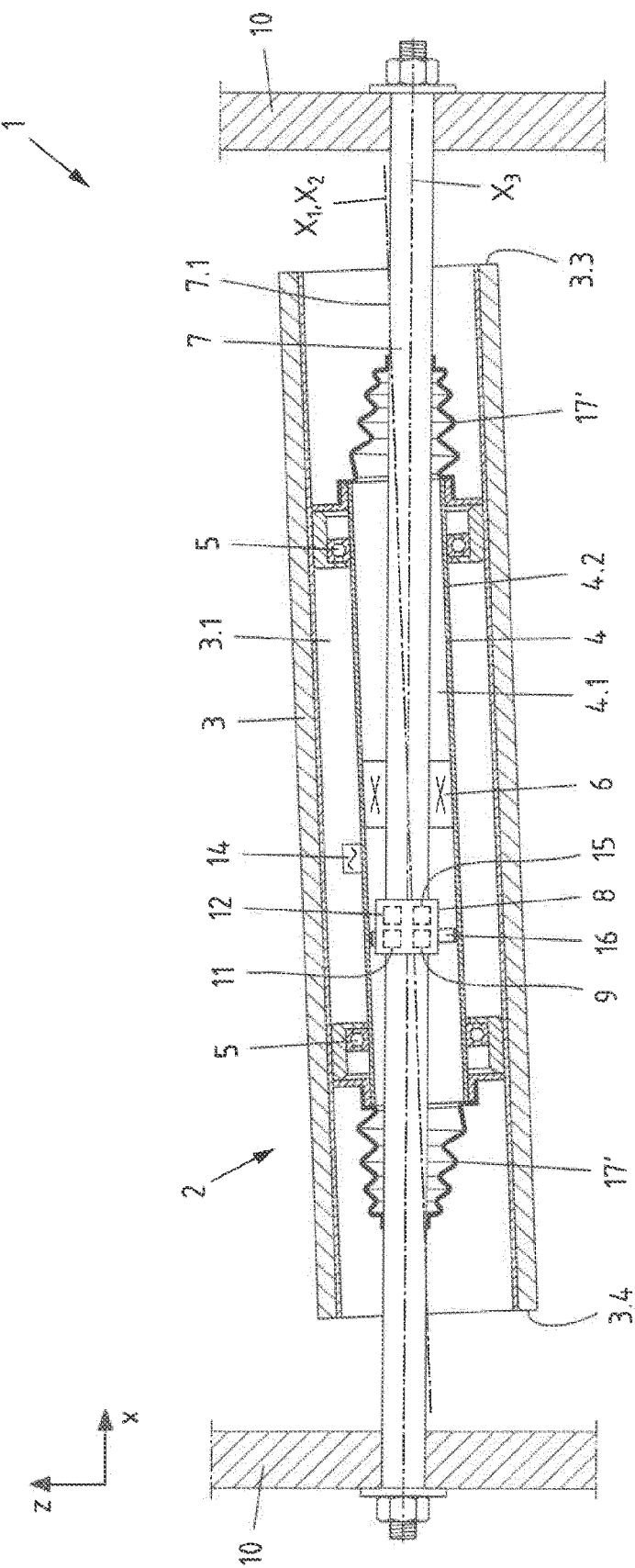
FIG. 6 the device of FIG. 5 in the same longitudinal section, wherein a guide unit of the device for a control intervention on the conveyor belt is rotated from a normal position into a steering position.

The embodiment example of the device according to the invention shown in FIGS. 5 and 6 differs from the embodiment example outlined in FIGS. 1 and 2 only with respect to the design of the sealing elements 17. Instead of sealing elements 17 in the form of brush seals, the device shown in FIGS. 5 and 6 has sealing elements 17 in the form of spring bellows (also called rubber bellows). The spring bellows 17' are each sealingly connected to the inner hollow-cylindrical body 4, preferably to its outer shell surface 4.2, and to the central axle 7. The spring bellows 17' are preferably designed in such a way that they seal rotary bearings 5, for example rolling bearings, arranged between the outer hollow cylindrical body 3 and the inner hollow-cylindrical body 4 against the ingress of dirt. The spring bellows 17' thus prevent or reduce the ingress of impurity material, for example dust-like impurity material, into the guide unit 2.

Figure 7:
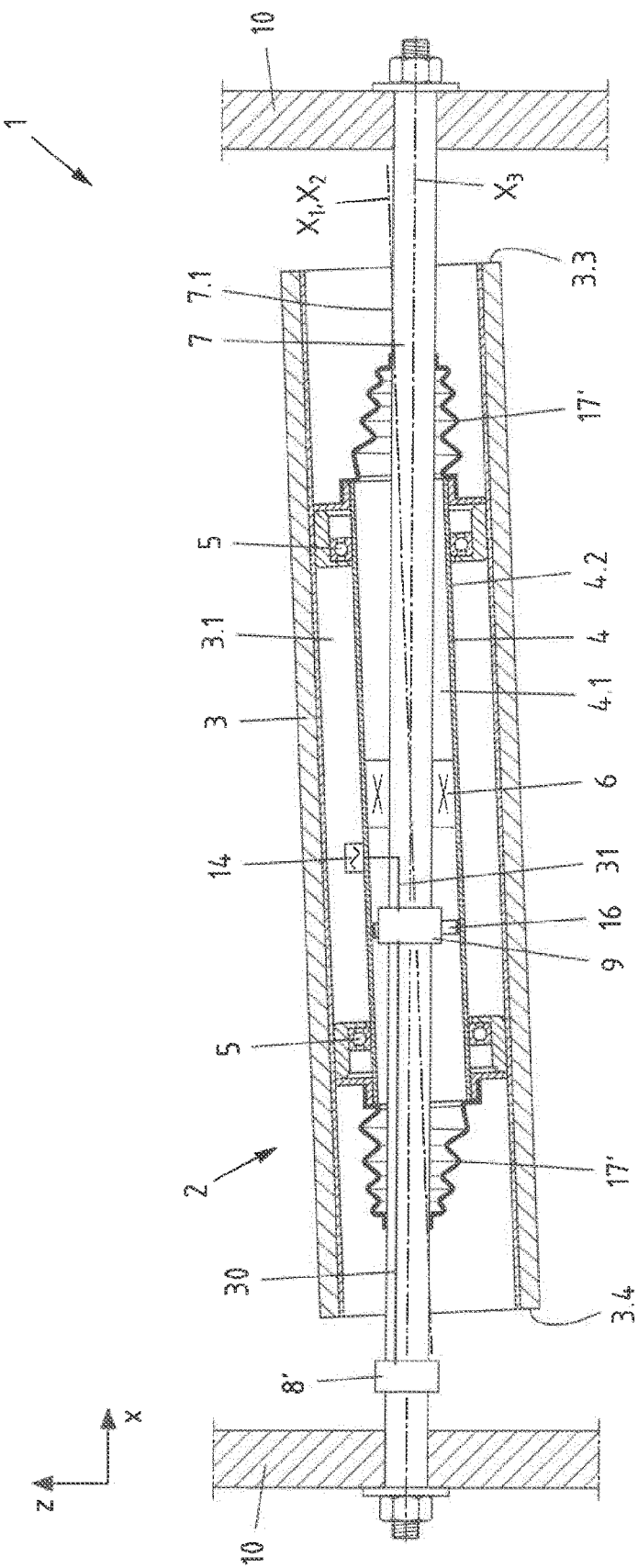
FIGS. 7 and 8 further embodiments of a device according to the invention for guiding a conveyor belt, in each case in a longitudinal section, wherein a guide unit of the device for a control intervention on the conveyor belt is rotated from a normal position into a steering position.

The embodiment example of the device according to the invention shown in FIG. 7 differs from the embodiment example sketched in FIGS. 5 and 6 only with regard to the design of the measuring and evaluation system 8. In the example sketched in FIG. 7, at least one sensor unit 9 and an evaluation unit 8' of the measuring and evaluation system 8 are arranged at a distance from one another. While the at least one sensor unit 9 is arranged inside the guide unit 2, for example inside the inner hollow cylindrical body 4, and shielded by the spring bellows 17', the evaluation unit 8' is located outside the hollow-cylindrical body 3. For example, the evaluation unit 8' is mounted between the end 3.4 of the hollow-cylindrical body 3 and one of the brackets 10 on the central axle 7. In this case, the sensor unit 9 is connected to the evaluation unit 8', for example, via a signal line 30. Optionally, the sensor unit 9 and/or the evaluation unit 8' can be connected to one or the above-mentioned supply electronics 14 via a supply line 31.

Figure 8:
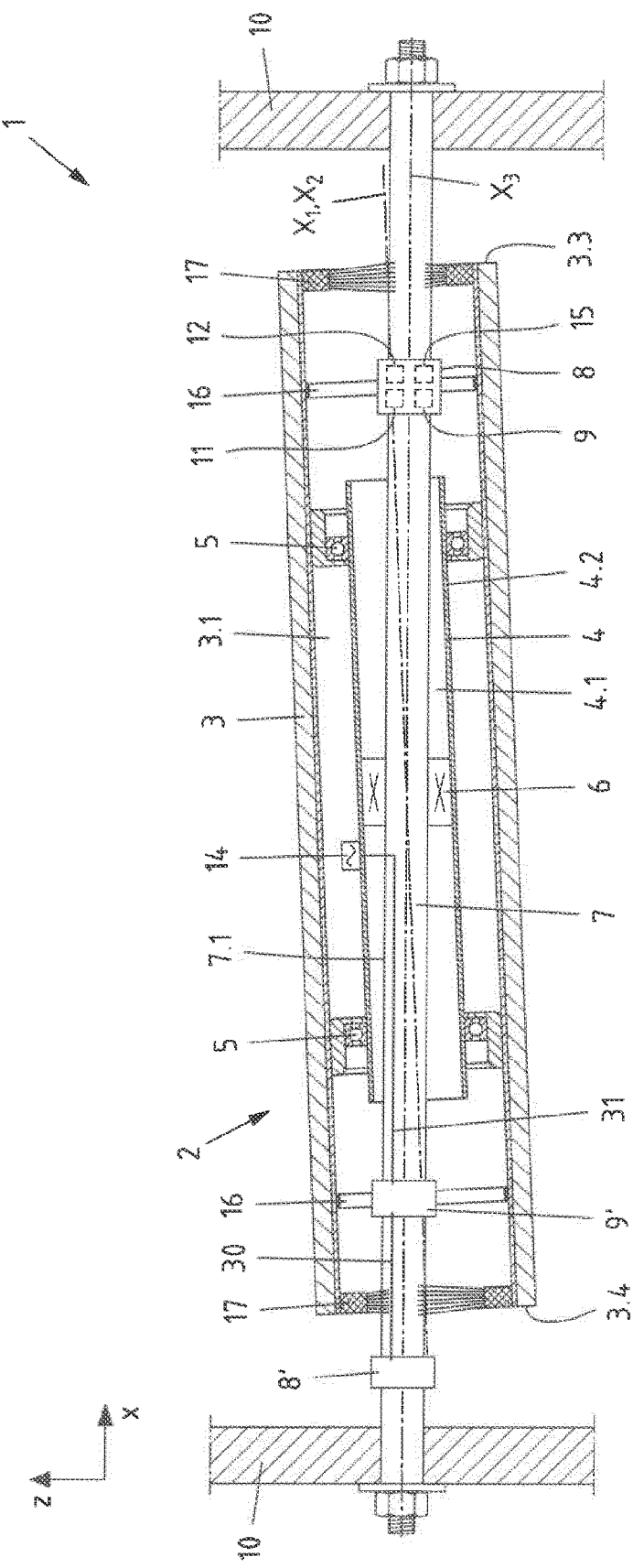

In FIG. 8, two further embodiment examples or variants of the device 1 according to the invention are shown. In one of these variants, which is shown in the region of the left end of the device 1, again at least one sensor unit 9' and one evaluation unit 8' of the measuring and evaluation system 8 are arranged at a distance from one another. While the at least one sensor unit 9' is arranged inside the guide unit 2, namely inside the outer hollow-cylindrical body 3 but outside the inner hollow-cylindrical body 4, the evaluation unit 8' is located outside the hollow-cylindrical body 3. The sensor unit 9' is thereby protected against contamination by sealing elements 17 in the form of brush seals. The evaluation unit 8' is mounted between the end 3.4 of the hollow-cylindrical body 3 and one of the brackets 10 on the central axle 7. In this case, the sensor unit 9' is connected to the evaluation unit 8', for example, via a signal line 30. Optionally, the sensor unit 9' and/or the evaluation unit 8' can be connected to one or the above-mentioned supply electronics 14 via a supply line 31. As an alternative to the arrangement or mounting on the central axle 7 shown in FIG. 8, the evaluation unit 8' can also be mounted on one of the brackets 10. At the same time, in the area of the right end of the device 1, FIG. 8 shows a variant in which the at least one sensor unit 9 and the evaluation unit are designed together as a compact measurement and evaluation system 8. In this embodiment example, however, in contrast to the embodiment example shown in FIGS. 1 and 2, the measuring and evaluation system 8 is not arranged inside but outside the inner hollow-cylindrical body 4 and inside the outer hollow-cylindrical body 3, the measuring and evaluation system 8 again being protected against contamination by sealing elements 17 in the form of brush seals. With regard to FIG.

8, reference is furthermore made to the above description of FIGS. 1 and 2 in order to avoid repetition.

Figure 9A:
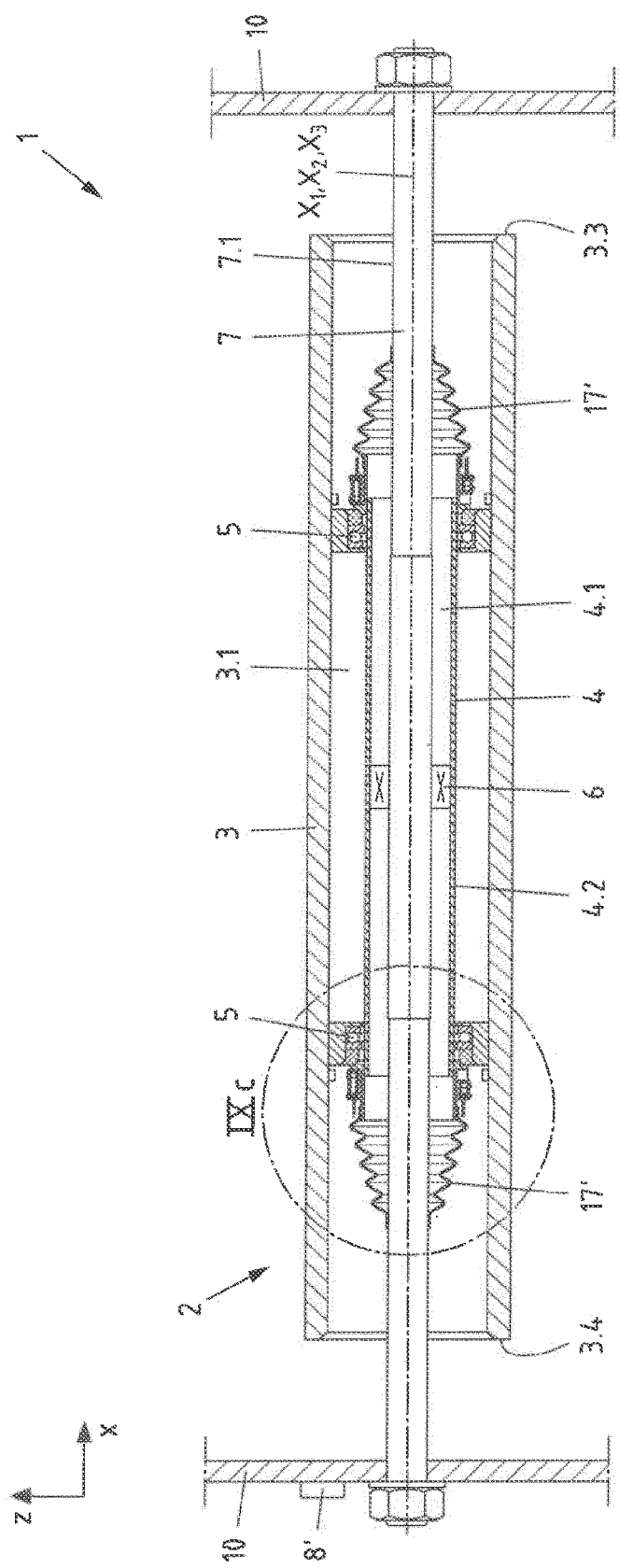
FIG. 9a a further embodiment of a device according to the invention for guiding a conveyor belt, in a longitudinal section.
Figure 9B:
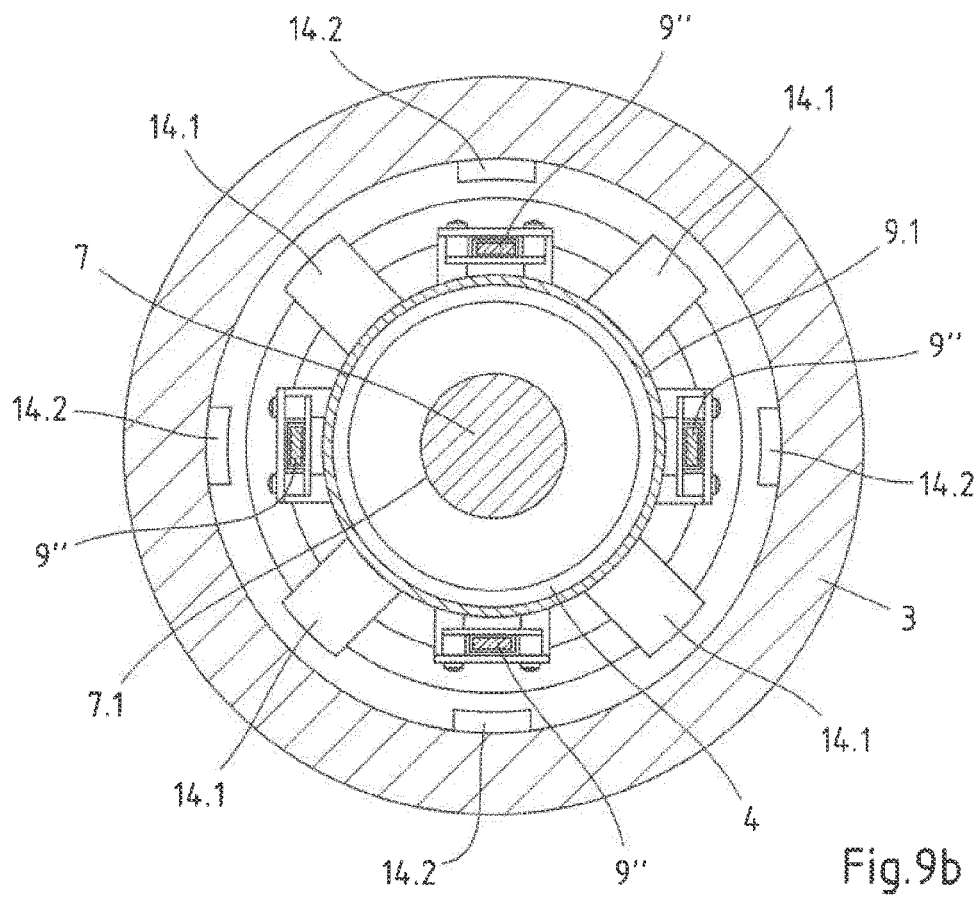
FIGS. 9b and 9c a cross-sectional view of the device of FIG. 9a along the line of intersection IXb-IXb in FIG. 9c and an enlarged view of detail IXc in FIG. 9a, respectively.
Figure 9C:
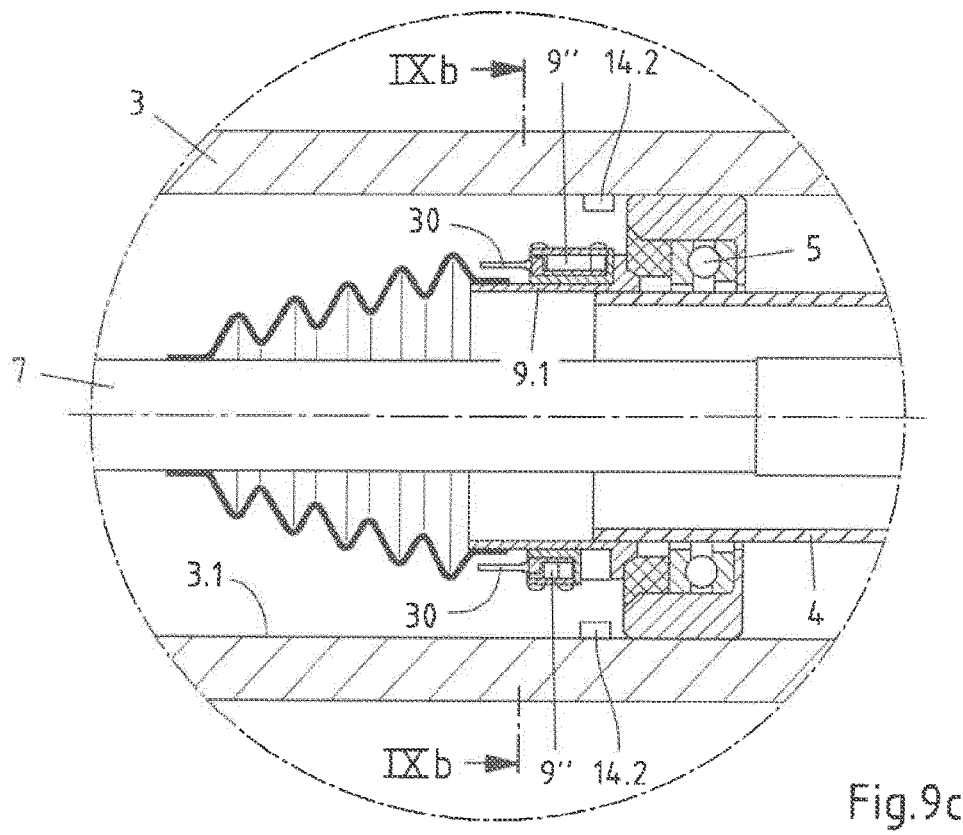

FIGS. 9a to 9c show a further embodiment example of the device 1 according to the invention. This embodiment example differs from the embodiment examples shown in FIGS. 1 to 7 with respect to the design and arrangement of the measurement and evaluation system. The measurement and evaluation system is arranged outside the inner hollow-cylindrical body 4, which can also be referred to as an inner tube. In this case, the at least one sensor unit 9" and the evaluation unit 8' of the measuring and evaluation system are arranged at a distance from each other. A sensor holder 9.1 is fitted onto one end of the inner hollow-cylindrical body (inner tube) 4 and is preferably non-positively or frictionally connected to the body 4. The sensor holder 9.1 is designed in the form of a bushing and is preferably connected to the shell outer surface 4.2 of the inner hollow-cylindrical body 4. The bushing or sensor holder 9.1 is made of plastic, for example. A sealing element 17', preferably in the form of a spring or rubber bellows, is in turn connected to the bushing or sensor holder 9.1. The sealing element 17' is connected to the central axle 7 and seals the interior of the hollow-cylindrical body 4 against dirt and dust ingress. The at least one sensor unit 9" of the measuring and evaluation system is installed on the sensor holder 9.1. For example, the sensor holder 9.1 is provided with four sensor units (sensors) 9", which are distributed over the circumference of the bushing-shaped sensor holder 9.1 and are spaced apart from one another. The sensor units 9" measure contactless in the direction of the central axle 7. The sensor measurement on the outside 7.1 of the central axle 7 is protected against dust by the sealing element 17'. In addition, at least part of the supply electronics 14 is also arranged on the sensor holder 9.1. In the embodiment example shown in FIG. 9, mutually associated elements 14.1, 14.2 of a generator system of the supply electronics 14 are arranged on the shell surface of the sensor holder 9.1 and on the inner surface 3.1 of the outer hollow cylindrical body 3, respectively (FIG. 9b). The elements 14.1, 14.2 of the supply electronics 14 are arranged axially offset to the sensor units 9" (FIG. 9c). The evaluation unit 8' is mounted outside the outer hollow-cylindrical body 3 of the guide unit 2 on one of the brackets 10 (FIG. 9a). Accordingly, the sensor units 9" and the supply electronics 14 are connected to the evaluation unit 8' via signal and supply lines 30, for example in the form of one or more cables. With regard to the embodiment example shown in FIG. 9a, reference is furthermore made to the above description of FIGS. 1 and 2 in order to avoid repetition.

Figure 10A:
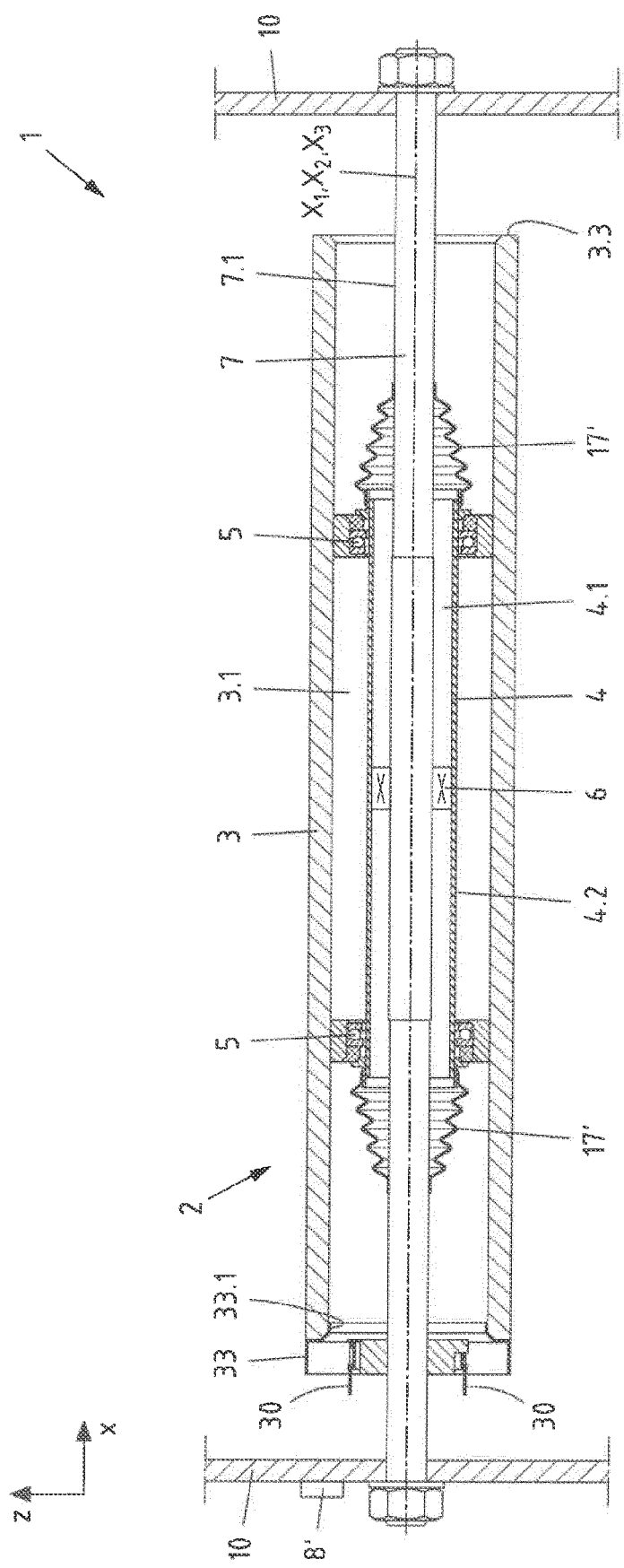
FIG. 10a a further embodiment of a device according to the invention for guiding a conveyor belt, in a longitudinal section.
Figure 10B:
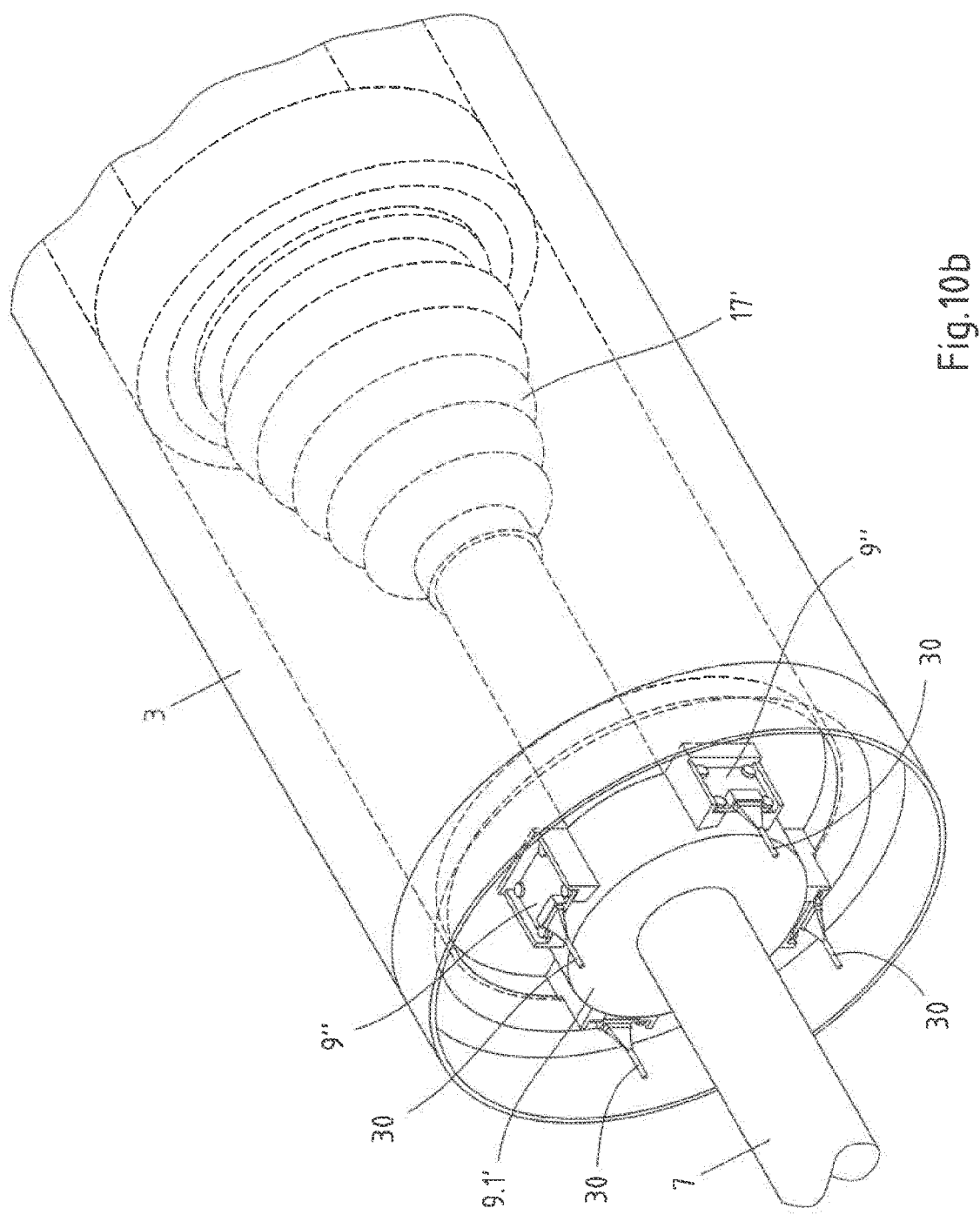
FIG. 10b the left end of the guide unit of the device of FIG. 10a, in a perspective view.

FIGS. 10a and 10b show a further embodiment example of the device 1 according to the invention. In contrast to the embodiment example shown in FIGS. 9a to 9c, the technique of measuring in this case is not arranged on the inner hollow-cylindrical body 4 and thus inside the outer hollow-cylindrical body (outer tube) 3 but at the end of the outer body 3 and thus essentially or largely outside the outer body 3. A sensor holder 9.1' is fitted onto the central axle 7 and is preferably non-positively or frictionally connected to the central axle 7. The sensor holder 9.1' is designed in the form of a bushing. For example, the sensor holder 9.1' is provided with four sensor units (sensors) 9", which are distributed over the circumference of the bushing-shaped sensor holder 9.1 and are spaced apart from each other. The sensor units 9" measure contactless in the direction of an annular or bushing-shaped body 33, which surrounds the sensor holder 9.1' at a radial distance and is connected to the end of the outer hollow-cylindrical body 3, preferably in a rotationally fixed manner. For this purpose, the ring- or bushing-shaped body 33 has a connecting section 33.1 which is inserted into the outer tube 3 in a force- or friction-locking manner. The body 33 associated with the sensor units (sensors) 9" can also be referred to as a reflector body. The sensor units 9" are connected to the evaluation unit 8' via signal lines 30, for example in the form of one or more cables. With regard to the embodiment example shown in FIGS. 10a and 10b, reference is made furthermore to the above description of FIGS. 1, 2 and 9a to 9c in order to avoid repetition.

The implementation of the invention is not limited to the embodiment examples shown in the drawing. Rather, numerous variants are conceivable which also make use of the invention indicated in the appended claims in a design deviating from the examples shown. For example, it is also within the scope of the invention that the at least one sensor unit 9 or the measuring and evaluation system 8 is arranged on the central axle 7 outside the inner hollow-cylindrical body 4 and inside the outer hollow-cylindrical body 3.

The invention claimed is:

1. A device for guiding a conveyor belt, having a guide unit with an outer and an inner hollow-cylindrical body, the inner hollow-cylindrical body having a first central axis and being arranged in the outer hollow-cylindrical body, which has a second central axis, and both hollow-cylindrical bodies each have a central axis, with at least one bearing for rotatably mounting the outer hollow-cylindrical body on the inner hollow-cylindrical body and with an articulation body designed for mounting the inner hollow-cylindrical body on a central axle, wherein the articulation body is further designed to allow a horizontal and/or vertical change in angle of the first and/or second central axis relative to a central axis of the central axle, characterized by a measuring and evaluating system comprising at least one sensor unit arranged inside and/or outside the guide unit, wherein the measuring and evaluating system is designed to detect the horizontal and/or vertical change in angle.

2. The device according to claim 1,
wherein the measuring and evaluation system has at least a second sensor unit, the second sensor unit being arranged inside the guide unit.

3. The device according to claim 1,
wherein the respective sensor unit is a sensor unit based on a contactless measuring principle.

4. The device according to claim 1,
wherein the measuring and evaluation system comprises at least one memory and computing unit, wherein the memory and computing unit is designed to store detected changes in angle and/or to compare a detected change in angle with stored changes in angle.

5. The device according to claim 1,
wherein a voltage source is arranged within the guide unit, the voltage source being designed to supply the at least one measuring and evaluation system.

6. The device according to claim 1,
wherein an electronic supply is arranged within the guide unit, the electronic supply being designed for contactless supply of the measuring and evaluation system and/or the voltage source.

7. The device according to claim 1,
wherein the measuring and evaluation system has an interface unit which is designed for a wireless signal connection.

8. The device according to claim 1,
wherein sealing elements are arranged inside the guide unit, preferably in the region of a first end and in the region of a second end of the outer hollow-cylindrical body.

9. The device according to claim 1,
wherein the measuring and evaluation system is mounted on the central axle or on the inner hollow-cylindrical body.

10. A system for monitoring and guiding a conveyor belt with a device according to claim 1 and a recording unit, wherein the recording unit is designed for a signal connection with the measuring and evaluation system.

11. The system according to claim 10,
wherein the recording unit comprises an optical signaling device and/or is designed for connection to an optical signaling device.

12. The system according to claim 10,
wherein the recording unit comprises an acoustic signaling device and/or is designed for connection to an acoustic signaling device.

13. The system according to claim 10,
wherein the recording unit comprises an evaluation unit and/or a display unit, wherein the evaluation unit has at least one memory and computing unit and wherein the memory and computing unit is designed for storing detected changes in angle and/or for comparing a detected change in angle with stored changes in angle.

14. The system according to claim 10,
wherein the recording unit is designed as a hand-held device.

15. The system according to claim 10,
wherein the conveyor belt has a marker or is provided with a marker, the system comprising a sensor for determining a measuring period and/or circulation time of the marker.

* * * * *